United States Patent

[11] 3,602,836

[72] Inventor Charles Gilbert Young
 Storrs, Conn.
[21] Appl. No. 812,119
[22] Filed Apr. 1, 1969
[45] Patented Aug. 31, 1971
[73] Assignee American Optical Corporation
 Southbridge, Mass.

[54] LASER STRUCTURE WITH A SEGMENTED LASER ROD
 6 Claims, 7 Drawing Figs.
[52] U.S. Cl. .................................................. 331/94.5,
 330/4.3
[51] Int. Cl. ................................................... H01s 3/06
[50] Field of Search .......................................... 331/94.5;
 330/4.3

[56] References Cited
UNITED STATES PATENTS
3,487,330 12/1969 Gudmundson .............. 331/94.5

Primary Examiner—William L. Sikes
Attorneys—William C. Nealon, Noble S. Williams and Robert J. Bird ABSTRACT: An optical maser or laser structure is provided with a segmented laser rod and is immersed in a coolant fluid for maintaining the operating temperature of the laser rod segments at a substantially uniform temperature. The segmented structure is formed of menisci-shaped segments of zero lens power, spaced apart a sufficient distance to permit free passage of sufficient coolant for temperature maintenance but close enough to prevent pump light from passing through the spaces between the segments.

INVENTOR.
CHARLES G. YOUNG
BY
William C. Nolte
ATTORNEY

INVENTOR.
CHARLES G. YOUNG
BY William C. Nealon
ATTORNEY

LASER STRUCTURE WITH A SEGMENTED LASER ROD

An optical maser or laser (light amplification by stimulated emission of radiation) is a well-known device consisting of a rod of lasering material between parallel, end mirrors, one of which provides full reflection and the other partial reflection and partial transmission of light therethrough. Pump light is introduced into the laser material, generally normal to the longitudinal axis of the rod between the two ends mirrors. The laser light energy is produced in the laser rod by photonic emission from active or high energy level ions in the body of the laser material, with the pump light increasing the number of ions from lower energy level to the upper energy level The pumping light energy abnormally increases the upper level population of ions and concomitantly depletes the lower level population of ions creating an inversion of energy states. Some of the ions in the upper energy level undergo a spontaneous, light emissive transition to the lower level, and the spontaneously emissive light reflects back and forth between the mirrored surfaces stimulating similar light emissive transitions from other upper level ions. As the stimulated emission reflects back and forth repeatedly through the rod a sufficiently high intensity pulse of laser light energy is emitted for transmission through the partially reflective surface.

A necessary condition for laser action is an inversion level (the excess of upper level ions over the lower level ions) which is sufficient so that the laser light produced by stimulations from the upper level population exceeds the light lost by absorption, scattering or otherwise lost within the laser rod. The inversion level for laser action is therefore dependent, to a great extent, upon light-loss factors within the laser structure. The ability to obtain the required inversion level is dependent on the amount of pumping light energy entering the body of laser material, and this in turn is then related not only to the total energy emitted by the pumping light which is available for absorption, but, also, to the extent of the exposed laser rod surface area on which the pumping light impinges. A substantial amount of pump light energy is necessary to produce the laser light, for example, the amount of pumping illumination required to produce laser action in ruby is approximately 500 watts per cubic centimeter of laser rod, and the amount required in neodymium glass is about 50 watts per cubic centimeter. The energy absorbed produces a considerable quantity of heat in the laser material, and unless special precautions are taken for removal of this heat, deleterious temperature rises will result.

Changes of temperature in the laser material cause unequal index of refraction across the lateral extent of the laser rod because of the linear expansion of the material. These changes together with he change of index with temperature at constant density, and stress-induced birefringence, produce an induced lens effect in the material which is deleterious.

According to the present invention there is provided a laser structure which provides means for easily maintaining a nearly constant temperature of the lasering material, and which provides high efficiency of the laser structure particularly in utilization of the pumping illumination. In general, the structure involves the use of a segmented laser rod, each internal segment of which is a curved plate of zero-lens-power, spaced apart providing a narrow channel for fluid coolant between the segments. The chief advantage of the segmentation is that the thermal and index of refraction gradients are axial rather than transverse to the laser beam. The segments are arranged so that pump light cannot pass directly through the space between the laser segments. Particularly when using a refraction index-matching fluid, the operation of the laser will be otherwise uneffected and a higher overall efficiency will be provided.

Included among the objects and advantages of the invention is a segmented laser rod provided with spaces between the segments for a coolant fluid so as to maintain an essentially uniform temperature in the laser rod during operation, and the structure includes means for circulating the coolant through the segmented rod. The segmented rod acts in a manner similar to an integral laser rod, and menisci-shaped segments prevent loss of pump illumination through the spaces between the segments, thereby maintaining the efficiency of the rod. One major advantage of the invention resides in the superior effectiveness of heat removal from the laser rod by dispersing produced heat into the coolant in which the segments of the laser rod are immersed.

These and other objects and advantages of the invention may be readily ascertained by referring to the following description and appended illustrations in which.

Figure 1:
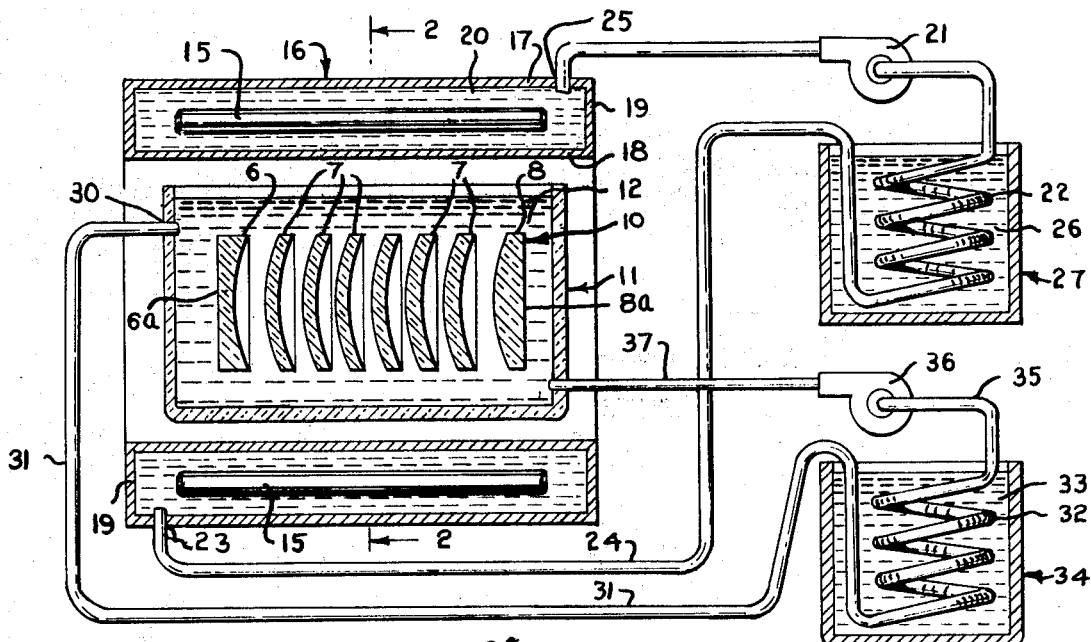
FIG. 1 is a partial, sectional elevation of a laser structure having a segmented laser rod immersed in a liquid coolant.
Figure 2:
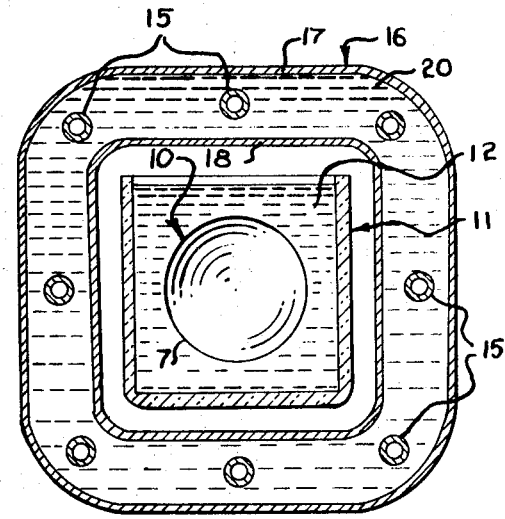
FIG. 2 is a sectional-elevational view taken along line 2—2 of FIG. 1.
Figure 4:
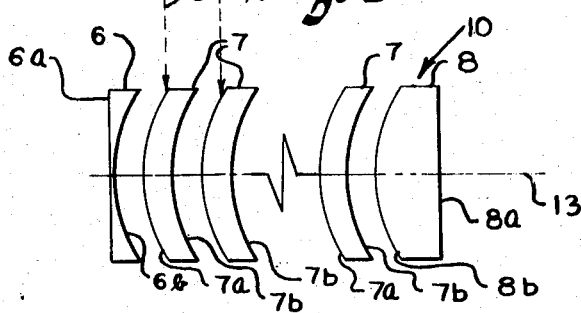
FIG. 4 is a detailed view of a portion of segmented laser rod.

The device illustrated in FIGS. 1, 2 and 4 includes a plurality of plates or laser rod segments, shown in general by numeral 10, which collectively form a laser rod. The laser rod is made of a solid laserable material, for example, ruby or neodymium glass, and these are mounted in closely spaced juxtaposition to each other. A solid laserable material is intended to define any solid material containing active ions in quantities so that when a population inversion is established in the active ions, a radiative transition from an excited energy level of the active ions to a lower level is possible, and in relation to the prevailing laser-emission light absorptive characteristics of the material, supports in said material a sufficient inversion in population between the two energy levels so as to provide at the wavelength of stimulated emission enough gain in light energy in excess of all light losses in the material to allow laser oscillations to occur. As shown in detail in FIG. 4, an end plate 6 includes a planar face 6a and a concave face 6b facing an adjacent plate 7. The meniscus-shaped plate 7 has a convex face 7a, of approximately the same curvature as the face 6b, and a concave face 7b. The faces 7a and 7b provide a plate of uniform thickness. The surfaces 7a and 7b are of approximately equal curvature to produce a zero-powered lens. A requisite number of intermediate plates 7 are mounted in position, and an end plate 8 is mounted adjacent such stack of plates. Each plate 8 includes a convex face 8b and a planar face 8a. The planar faces 6a and 8a can be mirrored, one for complete reflection and one arranged for partial transmission as desired for the particular laser. For example, it may allow 2 percent transmission. The curved surfaces on the plates should have a sufficient radius of curvature and the plates spaced so that light rays, indicated by numeral 9 in FIG. 4, will not pass directly through the spaces between the plates, but will impinge on the surfaces and be absorbed by the lasering material. This occurs even when pump light rays are directed at right angles to a longitudinal axis 13 passing through the spaced segments of the laser rod.

The individual segments of the rod should have zero power, in other words will pass laser light rays parallel to the longitudinal axis without magnification in either direction (will not diverge or converge the light rays passing therethrough). The planar surfaces 6a and 8a are parallel surfaces for reflecting light back and forth therebetween, through the lasering material of the plates.

The plates are spaced apart a sufficient distance to permit coolant to freely pass therebetween to provide sufficient cooling to keep the plates at a predetermined temperature. The plate thickness is chosen in respect to its diameter to provide predominantly axial cooling. The segmented laser rod is mounted in a tank 11, FIG. 1, which is filled with a transparent liquid coolant 12 completely immersing the plates within the coolant. The coolant may be water, heavy water, or a fluid having an index of refraction matching the material of the laser rod.

Figure 6:
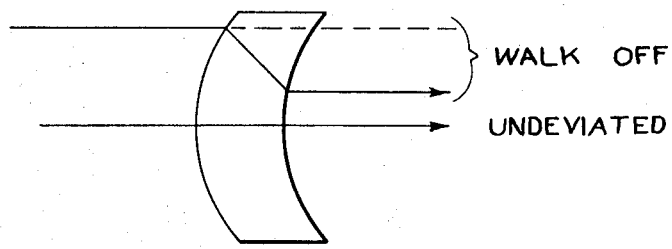
FIGS. 6 and 7 are schematic illustrations explaining one aspect of the invention.
Figure 7:
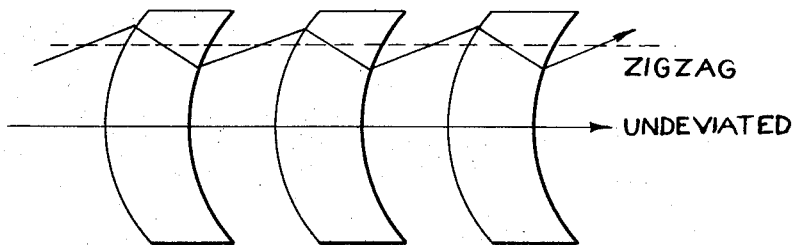

When a non-index matching fluid is used, other than on-axis rays must be nonparallel to the axis to prevent walk-off due to refraction at the surfaces and the finite plate thickness. (See FIG. 6). This can be prevented by proper end mirrors so the rays "zigzag". (See FIG. 7). This can either be done by using curved end mirrors, or nonzero-power minisci. One could also have an alternating series of other types of cooperating lens shapes within the design purview of the skilled optician.

As illustrated in FIG. 2, the tank 11 is essentially rectangular, and this is surrounded by a tubular jacket 16, spaced from the tank, in which are placed a plurality of high pressure mercury arc light tubes 15. The tubular jacket is provided with an exterior wall 17 which may be mirrored on the inside surface to aid reflection of light from the mercury arc tubes into the lasering material in the tank 11. The inner wall 18 of the tube must be transparent to permit transmission of light rays into the inner tank 11. End closures 19 close the tubular tank 16 for holding and permitting circulation of a transparent coolant material around the light sources 15.

The structure 16 may be made of glass or plastic material which is transparent, and the cooling liquid 20 may be water, heavy water, or other suitable transparent liquid for cooling the pump lamps. A supply reservoir or heat sink 27 for a refrigerated coolant 26, which may be brine, or the like, covers heat exchange coil 22. Coolant from tank 16 passes through a line 24 (connected at 23 to the tank 16) through coil 22 and then through a pump 21 and into an inlet connection 25 at the top of the tank 16 for circulating the cooling fluid therethrough. The coolant liquid for the laser rod in the interior tank 11 is circulated through a coil 32 immersed in a cooling liquid, such as brine 33, contained in a reservoir or heat sink 34. The liquid is withdrawn from the inner tank from a conduit 37 passing through a pump 36, through a line 35 connected with the coil 32, and exhausting through a line 31 into an inlet 30 at the top of the tank 11.

The thickness of the lasering plates should be such that, with the convex and concave faces cooled as above described, the temperature on a plane at the center between the curved faces of the plates should be about 10 times more uniform than the axial temperature gradient.

By making the outer surface of the jacket 17 a mirrored surface as above described, the level of the illumination obtained by the pump lamps will be increased. The absorption coefficient for pumping light into laser plates may be adjusted by varying the percentage of doping (the amount of metallic ion, usually one of the lanthanides) used in the laserable material, and thereby securing a constant absorption per unit volume of the laserable material within a factor of ± 10 percent. Electrical energy from any suitable source is supplied to the lamps 15, and this produced an intense light to which the plates of the laserable material are exposed on all sides including exposure to some of the curved surfaces, increasing the area of rod exposed. The lamps cause the plates of the segmented laser rod to lase, the laser light energy may be emitted from one end of the other of the assembly of the plates through the mirrored surfaces 6a and 8a, whichever surface has the lowest reflectivity.

Figure 5:
FIG. 5 is a plan view of one form of laser segment according to the invention.

As illustrated in FIGS. 1 and 2, the plates are in the form of circular disc, they may, however, be made square or rectangular as illustrated in FIG. 5 wherein the plates 47 are curved in cross section, showing the one concave face 47a. The opposite face is, of course, curved in the same manner, and, in general, as with the segments of FIG. 4 the faces are arcuate but generally parallel to each other so as to produce a zero-powered lens.

Figure 3:
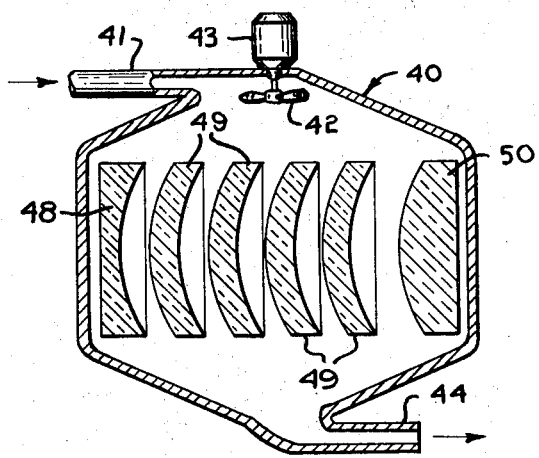
FIG. 3 is a partial sectional view of a modified form of a laser structure according to the invention.

An air-cooled laser as illustrated in FIG. 3, wherein a tank or container 40 has an inlet conduit 41, a fan 42 driven by a motor 43 and an outlet conduit 44 on the opposite side of a stack of laser plates. The stack includes an end plate 48 at one end, a series of double arcuate faced plates 49 in the middle and an end plate 50 at the opposite end. The container 40 may be tapered or sloped so that gaseous coolant on entering pipe 41 will be forced by the fan around and between the plates and subsequently through the outlet 44. The container 40 is formed of glass or other transparent material and is surrounded by a plurality of high pressure mercury arc light tubes (not shown), similar to that shown in FIG. 2, or other suitable means for imparting necessary light to cause the plates to lase.

As a specific example, two laser segments 6 and 8 with a Fabry-Perot mirror on each of the planar surfaces 6a and 8a respectively, are mounted on supporting frame approximately 10 centimeters apart. If one of the mirrors is silvered for maximum reflectivity, the other may be silvered for partial transmission of about 2 percent or more depending upon the particular laser system. Between the two end members are mounted the other members 7 with spaces left between each of the segments to allow for the passage of circulating coolant, but close enough to prevent passage of a direct light ray therebetween. With the laser rod formed of segments of approximately 1 centimeter in diameter, the space between the segments can be about 1 millimeter and the thickness of each segment about 3 millimeters. The coolant can be ordinary distilled water (at room temperature to start with) in a closed system. Deuterium (heavy water), however, is preferred because of its 10 times lower $1.06\mu$ absorption. The cooling system should be a closed one for the purposes of cleanliness. The practical upper temperature limit is the boiling point of liquid used. The lower by the freezing point.

The laser efficiency will be the highest when the index of refraction of the transparent coolant is approximately the same as that of the material for the laser rod. This prevents losses due to reflections at the coolant-laserable material interface due to differences in the index of refractions.

I claim:

1. In a laser structure having a segmented laser rod formed of a solid laserable material, the rod including a series of plates spaced apart and collectively forming the laser rod having a longitudinal axis centrally through all said plates, the series of plates including a pair of end plates and plurality of intermediate plates disposed between the end plates, there being a spacing between each pair of adjacent plates for passage of a coolant fluid therethrough, the improvement in which at least a group of intermediate plates has a series of curved opposed sequential faces which together collectively provide substantially zero lens power, and in combination, the spacings and curved opposed sequential faces prevent all light rays from passing between adjacent plates from one side of the structure to the other without impingement upon at least one of the plates at the series.

2. In the laser structure of claim 1, said laser rod is comprised of a series of plates each of which has a convex face and a concave face generally normal to the longitudinal axis with said faces being substantially parallel along their curves to provide a substantially uniform thickness of plate having a zero lens power; one end plate of said series having a planar, outside face and an inner, convex face and the opposite end plate having a planar outside face and an inner concave face, and in combination, the spacings and opposed sequential faces prevent light rays from passing between adjacent plates from one side of the structure to the other without impingement upon at least one of the plates of the series.

3. A laser structure according to claim 2 wherein the distance between said plates is approximate one-tenth the thickness of the plates intermediate said end plates.

4. A laser structure according to claim 2 wherein said planar surfaces on said end plates are mirrored to reflect light, and one said mirrored surface is arranged to be slightly transmissive.

5. A laser structure according to claim 2 wherein said plates are meniscus shaped.

6. A laser structure according to claim 2 wherein said plates between said end plates are substantially identical.